(12) United States Patent
Aratani et al.

(10) Patent No.: US 6,310,676 B1
(45) Date of Patent: Oct. 30, 2001

(54) LIQUID CRYSTAL DISPLAY APPARATUS

(76) Inventors: Sukekazu Aratani, 1963-8, Hata-cho, Hitachioota-shi, Ibaraki 313; Yoshiyuki Umeda, 17-1-504, Moriyama-cho 3-chome, Hitachi-shi, Ibaraki 316; Yasushi Tomioka, 17-1-304, Moriyama-cho 3-chome, Hitachi-shi, Ibaraki 316; Hisao Yokokura, 10-1, Higashinarusawa-cho 2-chome, Hitachi-shi, Ibaraki 316; Katsumi Kondo, 19-21, Aoba-cho, Hitachinaka-shi, Ibaraki 312; Setsuo Kobayashi, 3550, Hayano, Mobara-shi, Chiba 297, all of (JP)

( * ) Notice: Subject to any disclaimer, the term of this patent is extended or adjusted under 35 U.S.C. 154(b) by 0 days.

(21) Appl. No.: 09/498,615

(22) Filed: Feb. 7, 2000

Related U.S. Application Data

(63) Continuation of application No. 09/004,411, filed on Jan. 8, 1998.

(30) Foreign Application Priority Data

Jan. 21, 1997 (JP) .......................................... 9-8295

(51) Int. Cl.[7] .................................................. G02F 1/1333
(52) U.S. Cl. ............................................ 349/141; 349/124
(58) Field of Search ..................................... 349/141, 124

(56) References Cited

U.S. PATENT DOCUMENTS

| 5,734,451 | 3/1998 | Yanagawa et al. . |
| 5,760,856 | 6/1998 | Yanagawa et al. . |
| 5,760,857 | 6/1998 | Yanagawa et al. . |
| 5,852,485 | 12/1998 | Shimada et al. . |
| 5,892,562 | * 4/1999 | Yamaziki et al. ..................... 349/141 |
| 5,905,556 | 5/1999 | Suzuki et al. . |

* cited by examiner

Primary Examiner—James A. Dudek
(74) Attorney, Agent, or Firm—Antonelli, Terry, Stout & Kraus, LLP

(57) ABSTRACT

A liquid crystal display apparatus having a pair of substrates and a liquid crystal layer interposed between the pair of substrates. One of the pair of substrates has an electrode structure including a plurality of pixel electrodes and a plurality of common electrodes, an organic polymer film is formed on at least one of the pixel electrodes and the common electrodes, and the liquid crystal layer is in direct contact with the organic polymer film.

2 Claims, 7 Drawing Sheets

LIQUID CRYSTAL DISPLAY APPARATUS

CROSS REFERENCE TO RELATED APPLICATION

This is a continuation of U.S. application Ser. No. 09/004, 411, filed Jan. 8, 1998, the subject matter of which is incorporated by reference herein.

BACKGROUND OF THE INVENTION

The present invention relates to a liquid crystal display apparatus, and, more particularly, the invention relates to a liquid crystal display apparatus employing a lateral electric field method which is driven by applying an electric field in a direction nearly parallel to the substrate surface.

In prior art liquid crystal display apparatuses, the electrodes which are used for driving a liquid crystal layer are transparent electrodes disposed opposite to each other and respectively formed on two substrates. This structure comes from employing a display method typified by a twisted nematic display method in which the direction of the electric field applied to the liquid crystal is orientated in a direction nearly normal to the substrate surface. On the other hand, a method of employing comb-shaped electrodes, in which the direction of the electric field applied to the liquid crystal is orientated in a direction nearly parallel to the substrate surface, is proposed, for example, in Japanese Patent Publication No. 63-21907, U.S. Pat. No 4,345,249, WO 91/10936, Japanese Patent Application Laid-Open No. 6-22239-7 or Japanese Patent Application Laid-Open No. 6-160878. In this case, the electrodes do not need to be transparent, and so highly conductive, opaque metal electrodes are employed. In regard to the above-mentioned prior art display method in which the direction of the electric field applied to the liquid crystal is orientated in a direction nearly parallel to the substrate surface (hereinafter, referred to as the "lateral electric field method"), a method of reducing unevenness in the display, such as a domain on the electrode edge existing from the initial stage of use, has been proposed in Japanese Patent Laid-Open No.7159786, but there is no description therein concerning the elimination of unevenness in the display, which is seen as black spots produced during long-term use, or concerning the structure necessary for improving the productivity of the apparatus.

SUMMARY OF THE INVENTION

The inventors of the present invention have newly found that when a liquid crystal display apparatus of the lateral electric field type is used continuously for a long time, unevenness in the display, seen as black spots (hereinafter referred to as "black stains"), is produced. As a result of studying the cause of the black stains, it has been revealed that the black stains are produced by the following process.

(1) The liquid crystal is directly in contact with an electrode through a crack in a protective film.

(2) Electrochemical reaction occurs on the electrode due to a signal voltage applied to the electrode to produce an ionic substance.

(3) The produced ionic substance exudes onto the liquid crystal layer to reduce a voltage holding ratio, and consequently the spot is seen as black.

It can be seen from the above-mentioned considerations that the problem of black stain production can be solved by preventing any direct contact between the liquid crystal layer and the electrode.

An object of the present invention is to provide a liquid crystal display apparatus in which black stains are not produced. Another object of the present invention is to provide a method of manufacturing a liquid crystal display apparatus without producing black stains and with an increased productivity.

According to the present invention, by forming a thick protective film or thin electrodes, cracks do not occur in the protective film, and consequently the occurrence of black stains can be prevented. The cracks in the protective film are formed by cracks in a thin portion of the film due to a stress applied to the film. Particularly, the cracks are apt to occur in edge portions of the electrodes because thickness of the protective film there is thin. The reason for this is as follows.

An SiN film commonly used for the protective film has a characteristic of film growth only in a direction normal to the substrate. Therefore, in the case of a common electrode cross-sectional structure, where the edge portion of the electrode is nearly 90 degrees or a reentrant etch, the edge portion of the electrode cannot be covered with the protective film until the film thickness of the protective film becomes thicker than the film thickness of the electrode. Accordingly, the film thickness of the protective film at the edge portion of the electrode is determined by the difference between the film thickness of the protective film and the film thickness of the electrode film.

Therefore, in order to form a sufficiently thick protective film at the edge portion of the electrode, to prevent occurrence of the cracks, it is necessary that the film thickness of the protective film is sufficiently thicker than the film thickness of the electrode. The inventors of the present invention have concentratively studied the difference between the film thickness of the protective film and the film thickness of the electrode film necessary for eliminating black stain faults, and they have found as a result that the thickness of the protective film should be thicker than the film thickness of the electrode under the protective film by more than 0.4 $\mu$m.

Further, according to the present invention, the black stain faults can be eliminated by forming the protective film using an organic polymer film, instead of using an inorganic film formed through a film forming method under vacuum, such as the CVD method. The organic polymer film can be formed through the common wet method using a solution.

The wet film-forming method using a solution is composed of the three processes of (1) forming the solution film over the whole surface, (2) drying the solvent and flowing in the lateral direction of the solution, and (3) forming the film by drying the solvent. Since the film is formed over the whole surface of the substrate by the process (1) and the solution flows from the upper portion of the electrode to the lower portion to make the film thickness uniform by the solution flow in the process (2), a film which is relatively thick can be formed also in the edge portion of the electrode, as compared to the case of an inorganic film. The organic polymer film is so soft that cracks hardly occur, compared to an inorganic film, such as a SiN film.

For the above-mentioned reason, it is possible to reduce the black stain defect by using an organic polymer film for the protective film.

The materials capable of being used for the organic polymer film are various kinds of organic polymer, such as polyimide, acrylic polymer, epoxy polymer and benzocyclobutene polymer.

Further, according to the present invention, it is possible to suppress the occurrence of black stain faults by employing an electrode having a tapered etch. Since film growth takes place, even on an electrode having a tapered etch, from the initial stage, a protective film having a sufficient thickness also can be formed in the edge portion. Therefore, the occurrence of cracks can be suppressed to reduce the black stain faults. An electrode with a tapered etch can be formed by using an appropriate etching gas or an appropriate etching solution. For example, for a chromium electrode, an electrode with a tapered etch can be obtained by using an etching solution of cerium-sulfate-ammonium or the like. For an electrode made of MoTa, an electrode with a tapered etch can be obtained by using a mixed gas of $CF_4$ and $O_2$.

Furthermore, according to the present invention, it is possible to suppress the occurrence of black stain faults and reduce the film thickness of the protective film by employing a sufficiently thick alignment film without pin holes. That is, it is possible to eliminate black stain faults without decreasing the productivity.

Since the alignment film is formed as a uniform film without pin holes when the film thickness of the alignment film becomes a certain value, the alignment film can not only orientate the liquid crystal, but can serve as a protective film. Therefore, by forming the alignment film so that it is thick, it is possible to suppress the occurrence of black stains even if the protective film is thin. The alignment film having a sufficient film thickness can be obtained by a method of increasing the concentration of the solution without increasing the film-forming time. Therefore, increasing the thickness of the alignment film and reducing the thickness of the protective film shortens the film-forming time of the protective film. That is, there is an effect of improving the productivity.

The inventors of the present invention have concentratively studied the film thickness of the alignment film necessary for eliminating pin holes as well as for eliminating black stain faults, and they have found as a result that the alignment film should be thicker than 0.1 $\mu$m.

BRIEF DESCRIPTION OF THE DRAWINGS

These and other objects, features and advantages of the present invention will be understood more clearly from the following detailed description when taken with reference to the accompanying drawings, wherein.

DESCRIPTION OF THE PREFERRED EMBODIMENTS

[First Embodiment]

Figure 1:
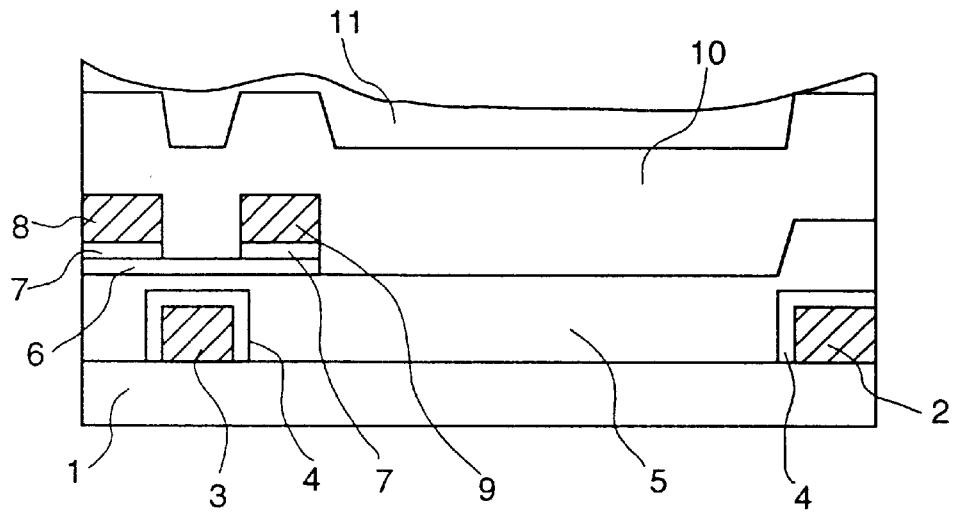
FIG. 1 is a cross-sectional view showing a first embodiment of an electrode substrate in accordance with the present invention.

FIG. 1 is a cross-sectional view showing a first embodiment of an electrode substrate in accordance with the present invention. A common electrode 2 and a scanning electrode 3 made of aluminum are formed on a glass substrate 1, and further, the surface is covered with an alumina film 4. A gate insulator film 5 made of SiN is further formed on the electrodes, and on the gate insulator film, an amorphous Si (a-Si) film 6, an n-type a-Si film 7 and a thin film transistor (TFT) composed of a signal electrode 8 and a pixel electrode 9 made of Al/Cr are formed. On the upper layer, a protective film 10 made of SiN is formed, and on the further upper layer, an alignment film 11 is formed.

Figure 2:
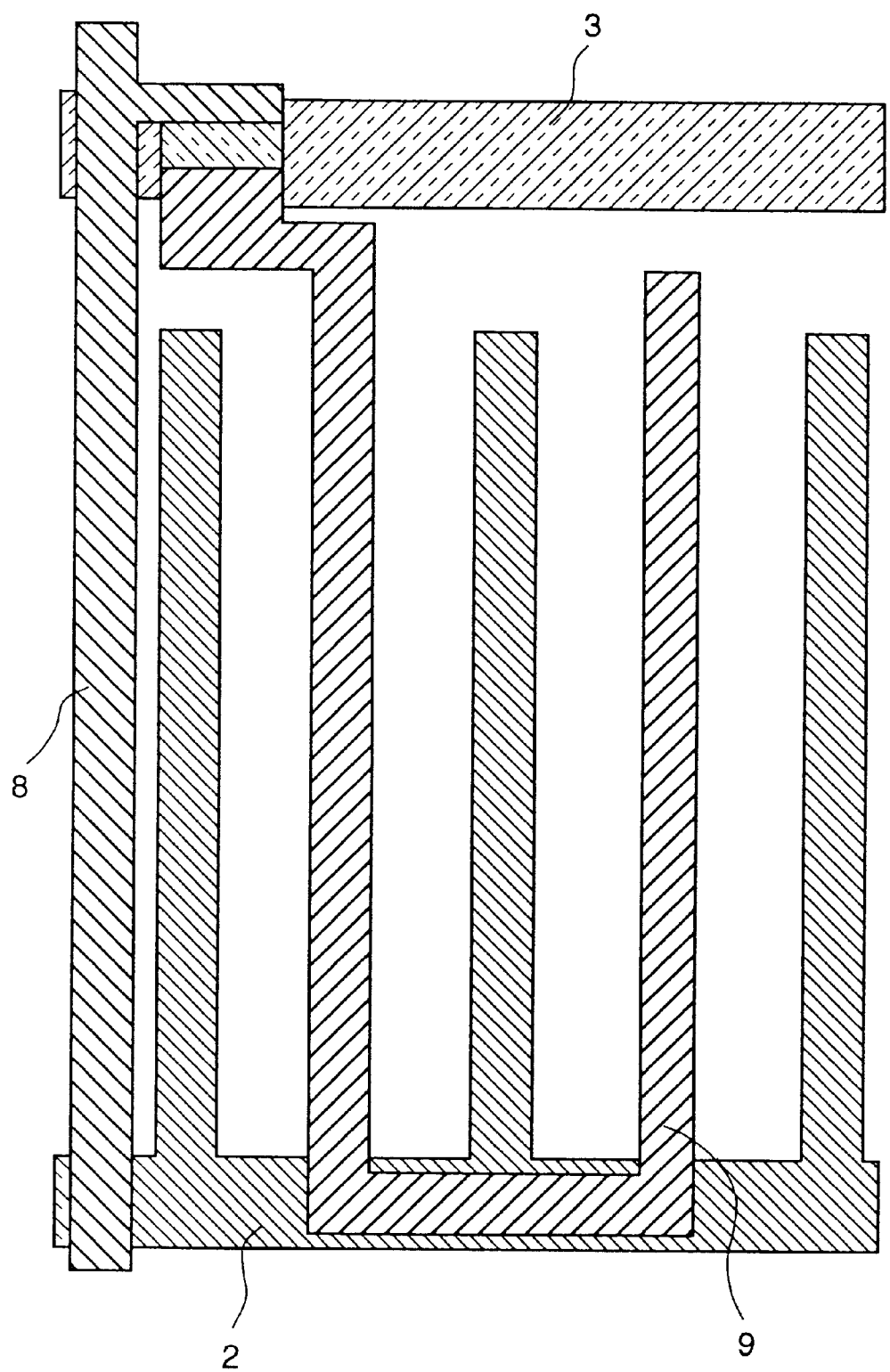
FIG. 2 is a plane view showing the structure of various kinds of electrodes in a unit pixel of FIG. 1.

FIG. 2 is a plane view showing the structure of various kinds of electrodes in a unit pixel in the first embodiment of the present invention. The common electrode 2 is arranged in parallel to the scanning electrode 3. The pixel is divided into four portions by the common electrode 2 and the pixel electrode 9, which are arranged in parallel to the image signal electrode 8. The pixel electrode 9 partially overlaps with the common electrode 2 to form a holding capacitance.

Figure 3:
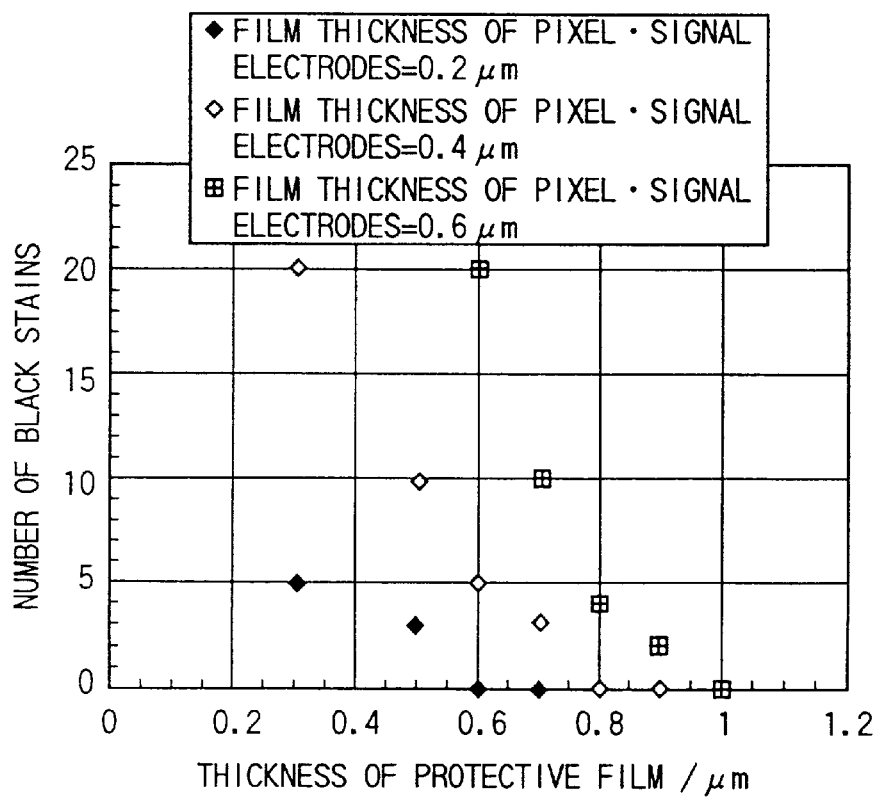
FIG. 3 is a graph showing the relationship between the thickness of the protective film and the number of black stains in the first embodiment in accordance with the present invention.

A characteristic of the present embodiment is that the thickness of the protective film 10 is greater than the thickness of the image signal electrode 8 and the thickness of the pixel electrode 9 by more than 0.4 $\mu$m. When the thickness of the protective film is sufficient, cracks hardly occur in the protective film and accordingly black stain defects do not take place. A result of confirming the occurrence of black stains in liquid crystal display apparatuses having protective films of different film thickness shows that when the thickness of the protective film is greater than the thickness of the signal electrode by more than 0.4 $\mu$m, black stain defects do not take place, even if the film thickness of the image signal electrode is varied from 0.2 $\mu$m to 0.6 $\mu$m, as shown in FIG. 3.

As described previously, the reason for this can be surmised as follows. When the thickness of the protective film is greater than the thickness of the signal electrode by more than 0.4 $\mu$m, the thickness of the protective film at the edge portion of the electrode becomes sufficiently thick. It can be considered that cracks do not occur in the protective film and consequently the occurrence of black stains can be prevented.

It can be understood from the above-mentioned explanation that the electrode materials of the scanning electrode, the common electrode, the pixel electrode and the signal electrode are not limited to the aforementioned materials, and any metallic material may be employed if it has a low electric resistance. For example, a metal, such as chromium, aluminum, copper, niobium or the like, or an alloy such as CrMo, AlTiTa or the like, may be employed.

[Second Embodiment]

Figure 4:
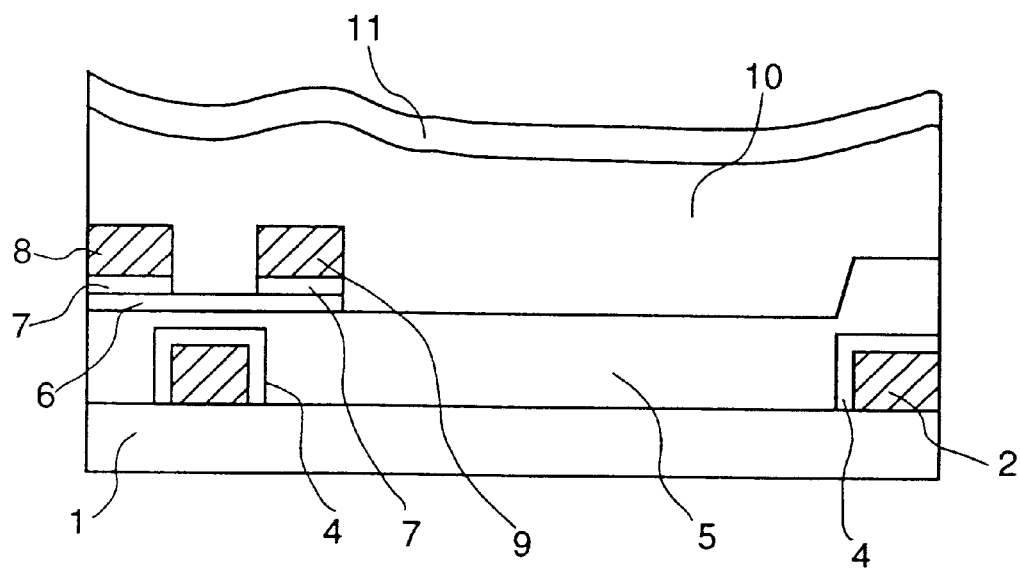
FIG. 4 is a cross-sectional view showing a second embodiment of an electrode substrate in accordance with the present invention.

FIG. 4 is a cross-sectional view showing a second embodiment of an electrode substrate in accordance with the present invention. A characteristic of the present embodiment is that an organic polymer is employed for the protective film. The organic polymer film can be formed through the common wet method using a solution. At that time, the film thickness is made uniform by means of the solution flow in the film-forming process, that is, there is a so-called step reducing effect. Therefore, a film having a relatively large thickness can be formed also in the edge portion of the electrode compared to the case of the film-forming method under a vacuum environment, such as the CVD method. Accordingly, cracks hardly occur. Further, an organic polymer film is so soft compared to an inorganic film, such as a SiN film, that cracks hardly occur from this point.

Figure 11:
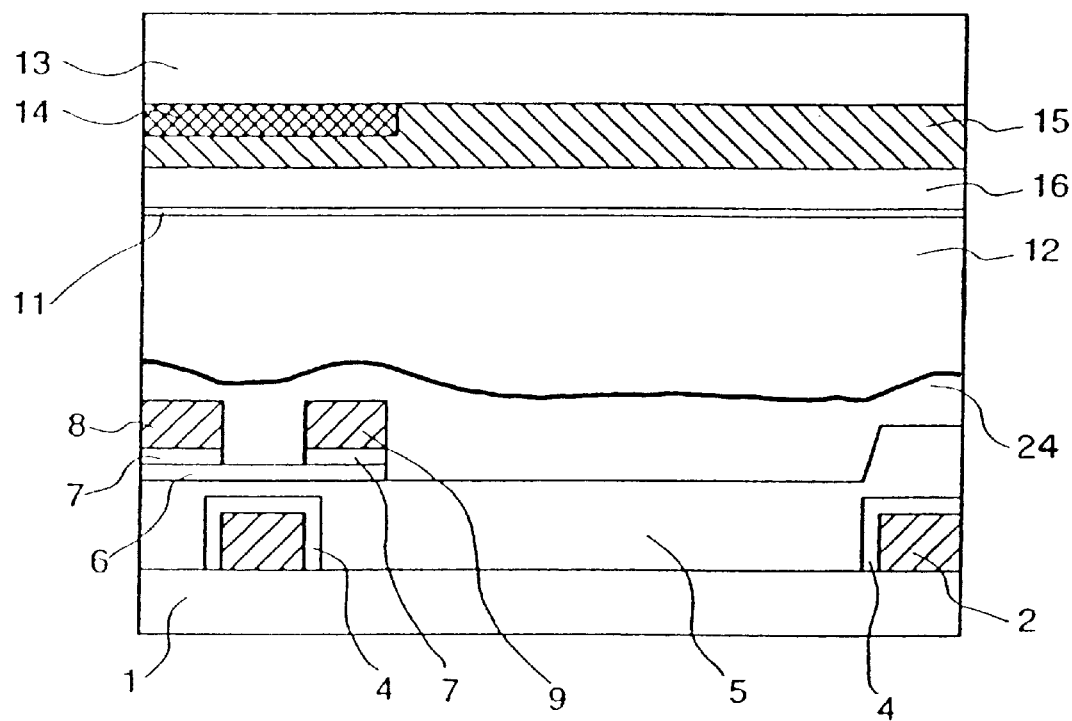
FIG. 11 is a cross-sectional view of a liquid crystal display apparatus corresponding to FIG. 8 and showing a protective film which serves as an alignment film in contact with at least one pixel electrode.

It can be understood from the above-mentioned explanation that use of an organic polymer material is not a limitation of the invention, but it is possible to employ any material for forming the protective film through a wet method using a solution. For example, a benzocyclobutene polymer, epoxy polymer or polyimide polymer may be employed. Particularly, when a polyimide polymer is employed, the process time can be shortened, and accordingly the productivity can be improved, because the protective film can also serve as the alignment film. The protective film serving as an alignment film is illustrated in FIG. 11 which corresponds to the illustration in FIG. 8 and such film 24 is in direct contact with at least one of the pixel electrodes 9 and the liquid crystal layer 12.

[Third Embodiment]

Figure 5:
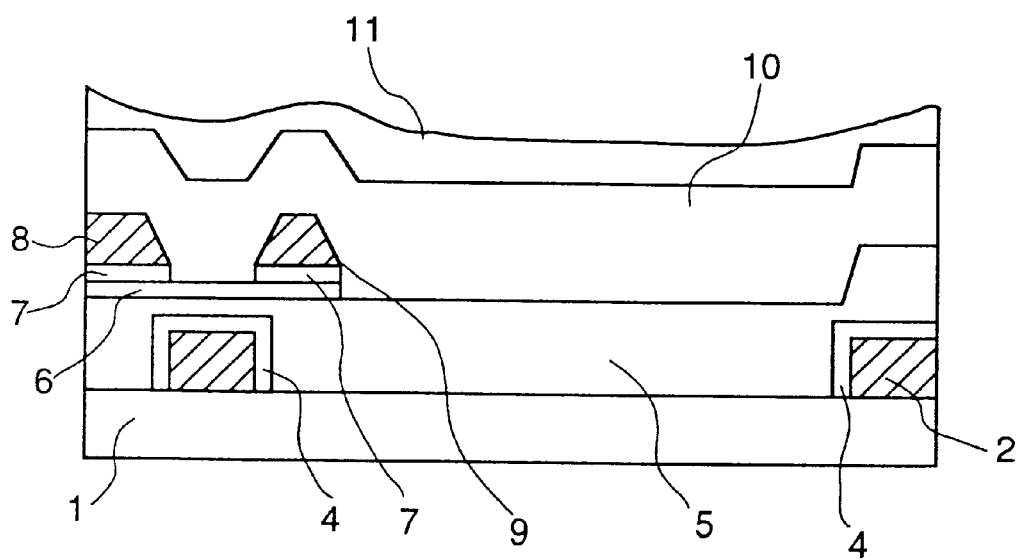
FIG. 5 is a cross-sectional view showing a third embodiment of an electrode substrate in accordance with the present invention.

FIG. 5 is a cross-sectional view showing a third embodiment of an electrode substrate in accordance with the present invention. A characteristic of the present embodiment is that the cross section of the signal electrode and the pixel electrode has a tapered etch. Therefore, the protective film is formed even in the edge portion of the electrode from the initial stage, and so the film at the edge portion becomes thick. Therefore, the occurrence of cracks can be suppressed to reduce the black stain faults.

An electrode with a tapered etch can be formed by using an appropriate etching gas or an appropriate etching solution. For example, for a chromium electrode, the normal taper structure can be obtained by using an etching solution of cerium-sulfate-ammonium or the like. For an electrode made of MoTa, an electrode with a tapered etch can be obtained by using a mixed gas of $CF_4$ and $O_2$.

In the present embodiment, the electrode materials of the scanning electrode, the common electrode, the pixel electrode and the image signal electrode are not limited to the aforementioned materials either, since any metallic material may be employed if it has a low electric resistance. For example, a metal, such as chromium, aluminum, copper, niobium or the like, or an alloy such as CrMo, AlTiTa or the like, may be employed.

[Fourth Embodiment]

Figure 6:
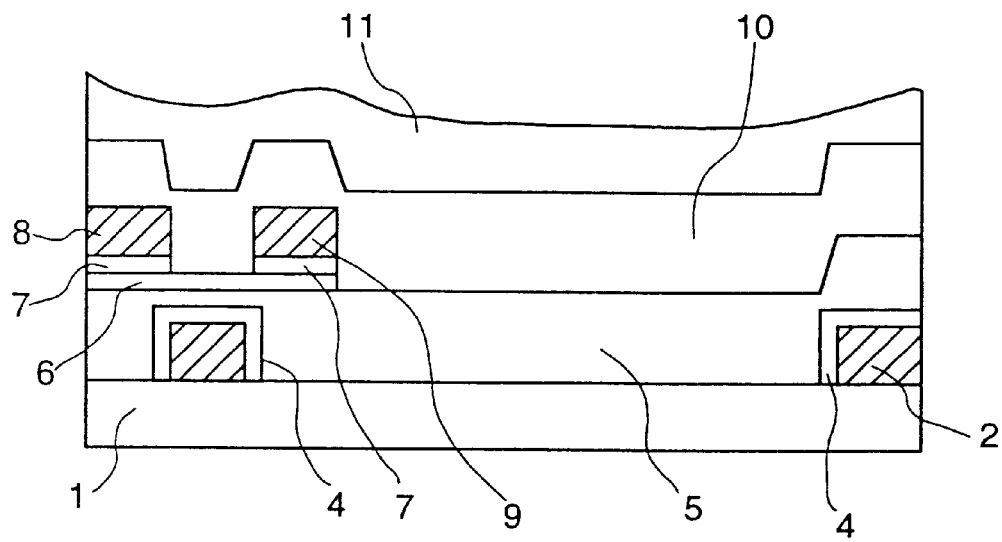
FIG. 6 is a cross-sectional view showing a fourth embodiment of an electrode substrate in accordance with the present invention.

FIG. 6 is a cross-sectional view showing a fourth embodiment of an electrode substrate in accordance with the present invention. A characteristic of the present embodiment is that the protective film is thin and the alignment film is thick compared to that of the first embodiment. Since the thick alignment film also serves as a protective film, it is possible to suppress the occurrence of black stains even if the protective film is thin. If the thickness of the protective film can be reduced, the total process time can be shortened and accordingly the productivity can be improved.

Figure 7:
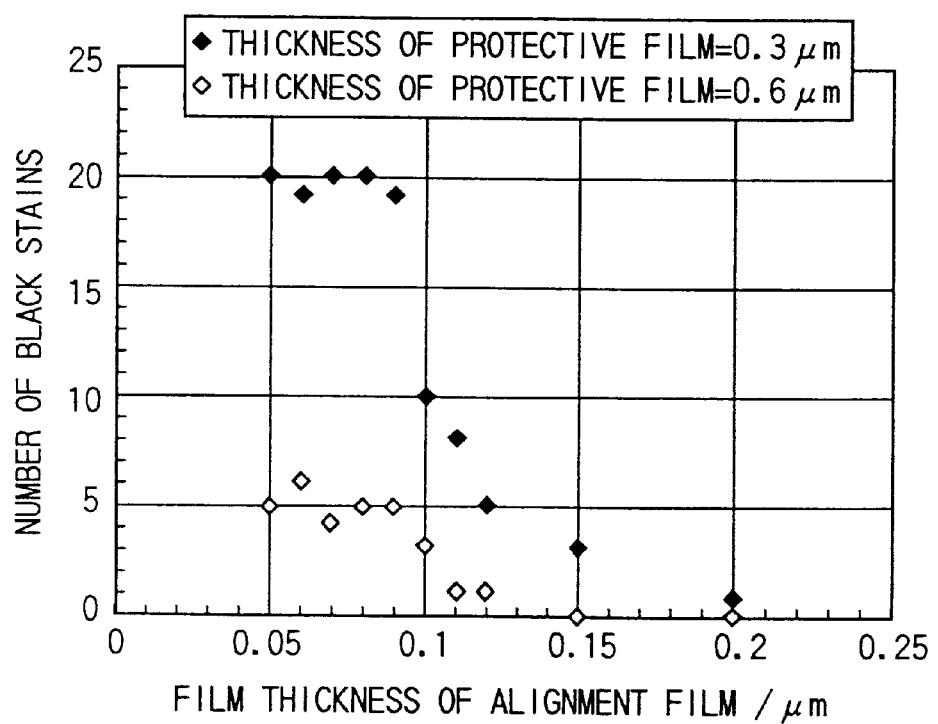
FIG. 7 is a graph showing the relationship between the thickness of the protective film and the number of black stains in the fourth embodiment in accordance with the present invention.

As a result of studying different thicknesses of the alignment film, it has been found that, if the film thickness of the alignment film is greater than 0.1 $\mu$m, it is possible for the film thickness of the protective film to be reduced without the occurrence of black stain defects (FIG. 7). It is assumed that the reason for this is that, although the alignment film having a film thickness of nearly 0.05 $\mu$m as in a common liquid crystal display apparatus is a non-uniform film with pin holes, the alignment film having a film thickness above 0.1 $\mu$m becomes a uniform film without pin holes.

The present invention is not limited to the material of the alignment film used in the present embodiment is not particularly limited, it is possible to use 2,2-bis[4-(p-aminophenoxy) phenyl-propane as a diamine, polyimide using pyromellitic acid dihydride as an acid anhydride, paraphenylenediamine or diamino-diphenylmethane as an amine component, a polyimide using fatty tetracarboxylic acid dianhydride or a pyromellitic acid dianhydride as an acid anhydride component.

Figure 8:
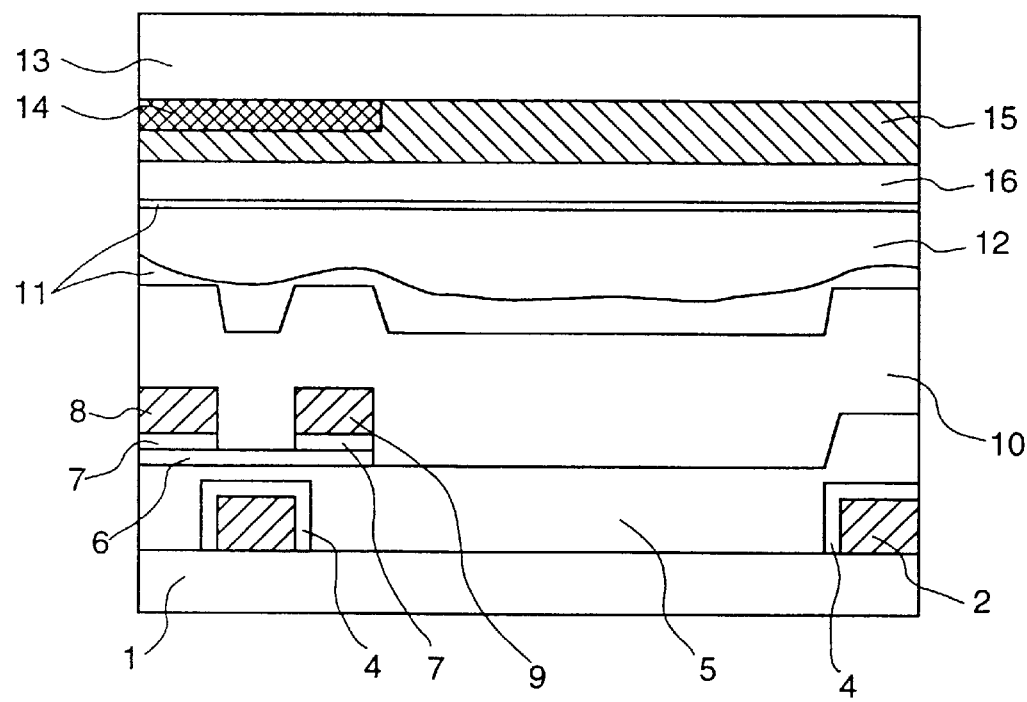
FIG. 8 is a schematic cross-sectional view of a liquid crystal display apparatus to which the present invention is applied.

FIG. 8 is a schematic cross-sectional view of a liquid crystal display apparatus to which the present invention is applied. On an opposite glass substrate 13 in the upper portion, taking the liquid crystal layer 12 as a base, there are formed a black matrix 14, a color filter 15, a color filter protective film 16 and an alignment film 11.

On a glass substrate 1 in the lower portion, taking the liquid crystal layer 12 as a base, there are formed a common electrode 2 and a scanning electrode 3, and the surface is covered with an alumina film 4. A gate insulator film 5 made of SiN is further formed on the electrodes, and on the gate insulator film, an amorphous Si (a-Si) film 6, an n-type a-Si film 7 and a thin film transistor (TFT) composed of a signal electrode 8 and a pixel electrode 9 made of Al/Cr are formed, on the upper layer, a protective film 10 made of SiN is formed, and on the further upper layer, an alignment film 11 is formed. For the structure of the substrate having these electrodes, the structure shown in FIG. 1 and FIG. 2 according to the first embodiment is depicted by way of example.

Figure 9:
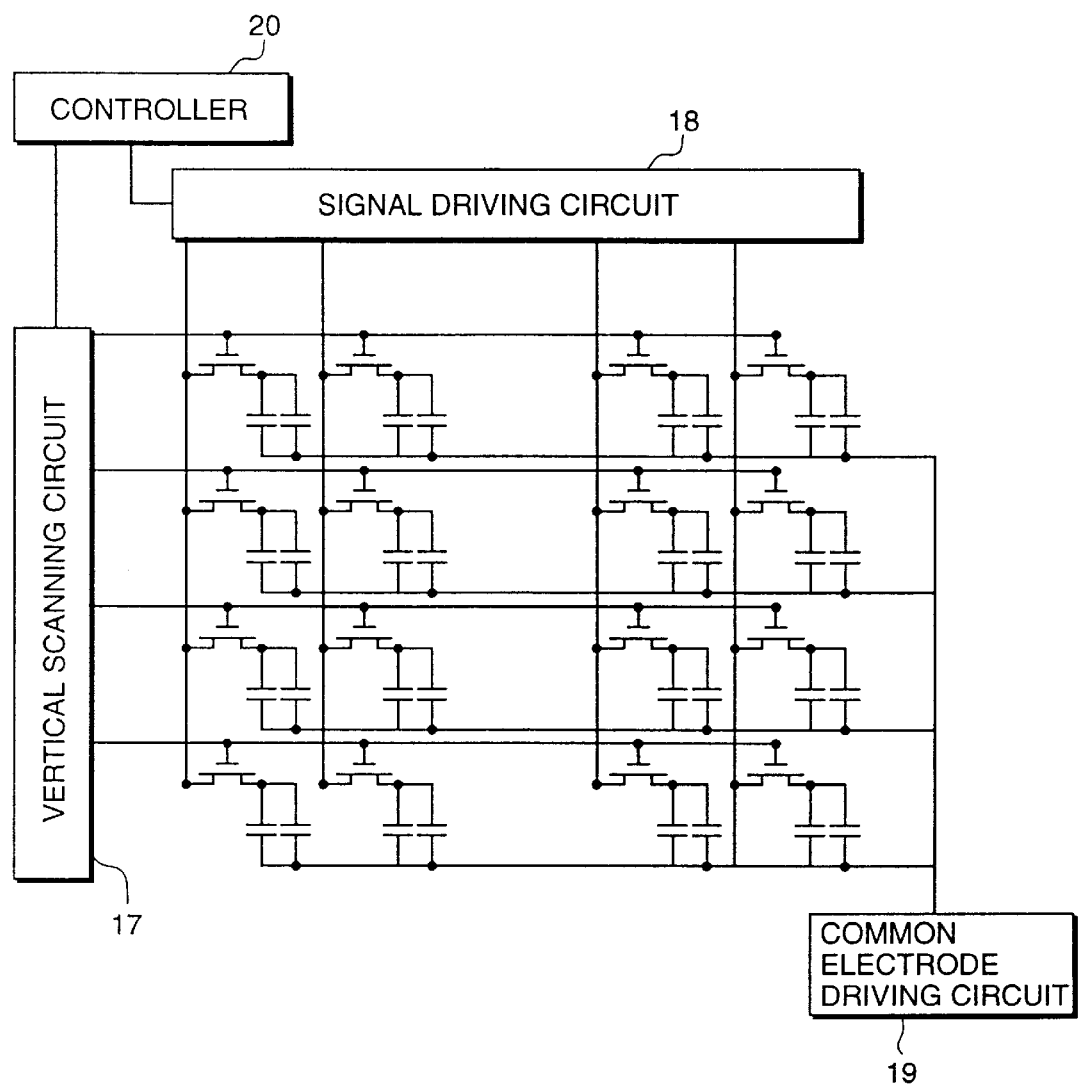
FIG. 9 is a schematic circuit diagram showing the construction of a driving system of a liquid crystal display apparatus in accordance with the present invention.

As shown in FIG. 9, a drive LSI is connected to the liquid crystal display apparatus, a vertical scanning circuit 17, a signal driving circuit 18 and a common electrode driving circuit 19 are connected onto the TFT substrate, and a scanning voltage, a signal voltage and a timing signal are supplied from a power source circuit and a controller 20 to perform active matrix drive.

Figure 10:
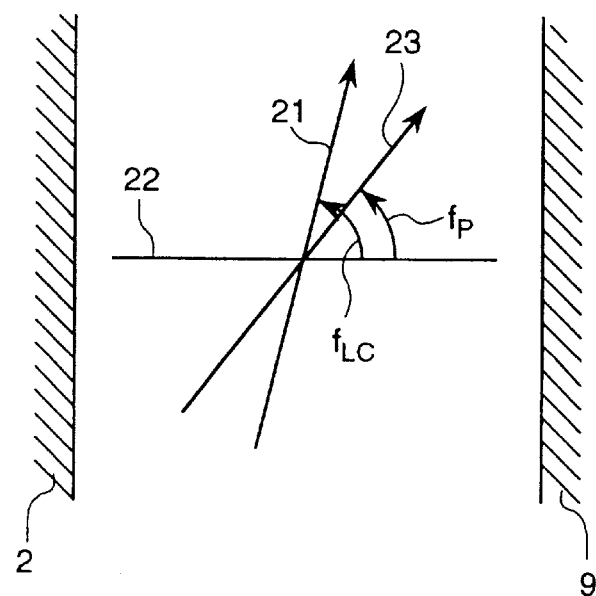
FIG. 10 is a diagram showing the relationship among a rubbing direction, an applied electric field direction and a direction of the polarizing plate transmission axis in a liquid crystal display apparatus according to the present invention.

FIG. 10 is a view showing the relationship among the rubbing direction, the applied electric field direction and the direction of the polarizing plate transmission axis in a liquid crystal display apparatus of the present embodiment. The rubbing directions 21 on the upper and the lower substrates are nearly parallel to each other, and the angles with the applied electric field directions 22 are set to 75 degrees ($\phi LC1=\phi LC2=75°$). The liquid crystal display apparatus is interposed between two polarizing plates, and one of the polarized plate transmission axes 23 is set nearly parallel to the rubbing direction, that is, ($\phi P1=75°$, and the other is set so as to intersect with the one of the polarized plate rubbing directions at a right angle, that is, $\phi P2=-15°$. By doing so, it is possible to obtain a normally closed characteristic.

By the above-mentioned structure, it is possible to provide a liquid crystal display apparatus having a good display quality without black stain defects.

By the above-mentioned structure, it is possible to provide a liquid crystal display apparatus of the lateral electric field type without display unevenness produced by black spots.

What is claimed is:

1. A liquid crystal display apparatus comprising:

a pair of substrates; and a liquid crystal layer interposed between said pair of substrates;

wherein one of said pair of substrates has an electrode structure including a plurality of pixel electrodes and a plurality of common electrodes, an organic polymer film is formed on at least one of said plurality of pixel electrodes and said plurality of common electrodes, and said liquid crystal layer is in direct contact with said organic polymer film, and wherein said organic polymer film formed on said at least one of said plurality of pixel electrodes and said plurality of common electrodes is in direct contact with said at least one of said plurality of pixel electrodes and plurality of common electrodes and said organic polymer film serves both as a protective film for said at least one of said plurality of pixel electrode and said plurality of common electrode and an alignment film for said liquid crystal layer.

2. A liquid crystal display apparatus comprising:

a pair of substrates; and a liquid crystal layer interposed between said pair of substrates;

wherein one of said pair of substrates has an electrode structure including a plurality of pixel electrodes and a plurality of common electrodes, a protective film is formed on at least one of said plurality of pixel electrodes and said plurality of common electrodes, said protective film is an organic polymer film, and said liquid crystal layer is in direct contact with said protective film, and wherein said protective film being said organic polymer film formed on at least one of said plurality of pixel electrodes and said plurality of common electrodes is in direct contact with said at least one of said plurality of pixel electrodes and said plurality of common electrodes and further serves as an alignment film for said liquid crystal layer.

* * * * *